(12) United States Patent
Sunahara et al.

(10) Patent No.: US 7,300,608 B2
(45) Date of Patent: Nov. 27, 2007

(54) BLUE COLORED COMPOSITION FOR COLOR FILTER AND COLOR FILTER

(75) Inventors: Kenro Sunahara, Tokyo (JP); Mayumi Ogura, Tokyo (JP); Ichiro Toyoda, Tokyo (JP); Takumi Saito, Tokyo (JP); Hidesato Hagiwara, Tokyo (JP); Takeshi Itoi, Tokyo (JP); Hiromitsu Ito, Tokyo (JP)

(73) Assignees: Toyo Ink Mfg. Co., Ltd., Tokyo (JP); Toppan Printing Co., Ltd., Tokyo (JP)

( * ) Notice: Subject to any disclaimer, the term of this patent is extended or adjusted under 35 U.S.C. 154(b) by 398 days.

(21) Appl. No.: 11/012,325

(22) Filed: Dec. 16, 2004

(65) Prior Publication Data

US 2005/0131114 A1 Jun. 16, 2005

(30) Foreign Application Priority Data

Dec. 16, 2003 (JP) .............................. 2003-417859

(51) Int. Cl.
*F21V 9/08* (2006.01)
*G01B 5/23* (2006.01)

(52) U.S. Cl. ...................... 252/586; 252/582; 106/494; 359/891; 430/7

(58) Field of Classification Search ................ 252/582, 252/586; 106/494
See application file for complete search history.

(56) References Cited

U.S. PATENT DOCUMENTS 4,934,791 A * 6/1990 Shimizu et al. ............. 349/107
6,280,890 B1 8/2001 Sawamura et al.
6,455,207 B1 * 9/2002 Katoh et al. .................... 430/7
6,528,564 B1 * 3/2003 Xia ............................. 524/242
6,890,380 B2 * 5/2005 Giger et al. ................. 106/493
2004/0185362 A1 * 9/2004 Arthur et al. ........... 430/108.21
2004/0236006 A1 * 11/2004 Tanaka et al. .............. 524/543
2005/0112501 A1 * 5/2005 Ikegami et al. ........... 430/281.1
2005/0153231 A1 * 7/2005 Katoh et al. ............. 430/270.1

FOREIGN PATENT DOCUMENTS

| JP | 10-130547 | | 5/1998 |
| JP | 2001-141922 | | 5/2001 |
| JP | 2001-264528 | | 9/2001 |
| JP | 2001264528 | * | 9/2001 |
| WO | WO002068541 A1 | * | 9/2002 |
| WO | WO003072614 A2 | * | 9/2003 |

OTHER PUBLICATIONS

Eastman Cellulose Acetate Butyrate CAB-531-1, Publication E-134H, Eastman Chemical Company, Jul. 1994.*

* cited by examiner

*Primary Examiner*—Randy Gulakowski
*Assistant Examiner*—Timothy J. Kugel
(74) *Attorney, Agent, or Firm*—Nixon & Vanderhye P.C.

(57) ABSTRACT

A blue colored composition for a color filter contains a pigment carrier comprising a transparent resin, a precursor thereof or a mixture thereof, a blue pigment having a specific surface area of 90 to 140 m$^2$/g, and a violet pigment having a specific surface area in a range of 100 to 150 m$^2$/g, but having a greater specific surface area than that of the blue pigment used. A color filter includes a filter segment formed from the blue colored composition.

8 Claims, 1 Drawing Sheet

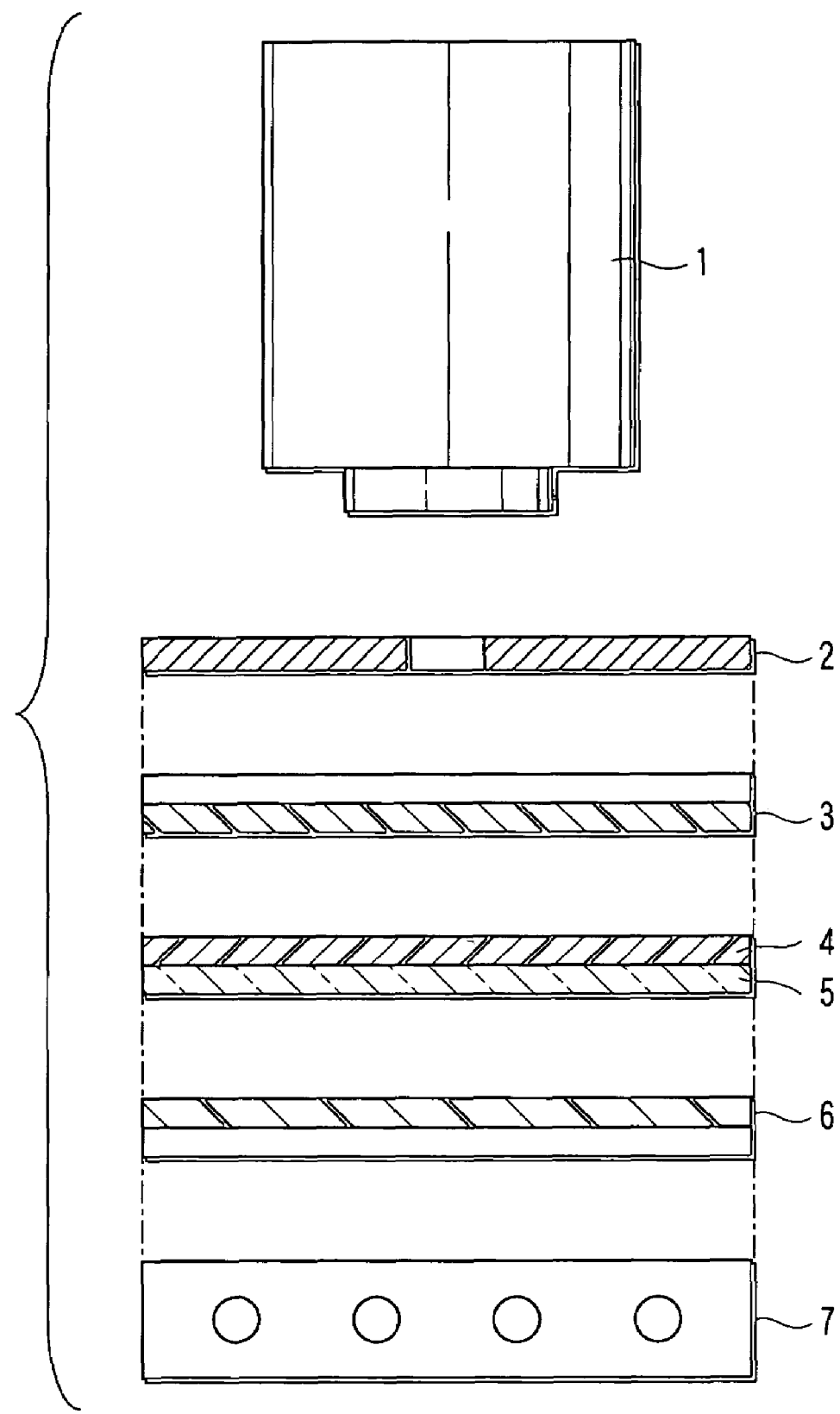
FIGURE

BLUE COLORED COMPOSITION FOR COLOR FILTER AND COLOR FILTER

BACKGROUND OF THE INVENTION

1. Field of the Invention

The present invention relates to a blue colored composition for a color filter, which is used for forming a color filter for use in a color liquid crystal display device and a color image pickup tube element, and a color filter formed using the same.

2. Description of the Related Art

A liquid crystal display device has a liquid crystal layer provided between two polarizers. The liquid crystal layer controls a polarization degree of light having passed through the first polarizer, controlling an amount of light passing through the second polarizer, thereby effecting the display. Presently, a liquid crystal device using a twistednematic (TN)-type liquid crystal is prevailing. The liquid crystal display enables color display by providing a color filter between two polarizers. Since the device has been used in a television or a personal computer monitor in recent years, a color filter is increasingly required to have a high luminance and a high contrast.

A color filter includes fine stripe filter segments having two or more different hues arranged in parallel to or intersected with each other on the surface of a transparent substrate such as glass, or fine stripe filter segments horizontally and vertically arranged at a constant sequence. The filter segments are fine and the width is several microns to several hundred microns, and they are regularly arranged at a predetermined sequence by every hue.

In general, a transparent electrode for driving liquid crystal is formed on the color filter by vapor deposition or spattering in a color liquid crystal display device. Further, an alignment film for aligning the liquid crystal in a predetermined direction is formed over the transparent electrode. In order to make the best use of the performances of these transparent electrode and alignment film, the formation of them is required to be carried out at a high temperature of usually 200° C. or more, and preferably 230° C. or more. Accordingly, the color filter is presently prepared mainly by a method called a pigment dispersion method wherein a pigment, which is excellent in light resistance and heat resistance, is employed as a colorant.

However, generally, a color filter with a pigment dispersed therein has a problem that scattering of light due to a pigment disturbs a polarization degree controlled by a liquid crystal. Specifically, light is likely to be leaked when light must be shut out (OFF state) and transmitted light is attenuated when light must be transmitted (ON state). Thus, a ratio of luminances (contrast ratio) on a display device in the ON state and the OFF state becomes low.

In order to realize a high luminance and a high contrast of a color filter, a pigment to be contained in a filter segment has been hitherto subject to finely-dividing treatment. For example, Jpn. Pat. Appln. KOKAI Publication No. 2001-264528 discloses preparing a red pigment by pouring a solution of a diketopyrrolopyrrole pigment in a concentrated sulfuric acid into water to precipitate a pigment. Then, a mixture containing the precipitated pigment, a pigment derivative, a water-soluble inorganic salt, and a water-soluble organic solvent which does not substantially dissolve this water-soluble inorganic salt is kneaded and then the water-soluble inorganic salt and the organic solvent are removed from the kneaded mixture.

However, even when a pigment (obtained by subjecting particles called crude having a particle diameter of 10 to 100 μm as prepared by a chemical reaction to pigmentation treatment to form a mixture of primary particles and secondary particles which are an aggregates of primary particles) is simply finely-divided by various finely-dividing treatment methods, a pigment in which finely dividing of primary particles or secondary particles has been progressed is generally easily aggregated and, when finely dividing has progressed too much, a huge massy pigment solid is formed. Further, when a pigment in which finely dividing has progressed is dispersed in a pigment carrier such as a resin, and is tried to be stabilized by putting secondary particles of a pigment as close to primary particles as possible again, it is very difficult to obtain a stable colored composition.

A colored composition obtained by dispersing a pigment, in which finely dividing has progressed, in a pigment carrier often becomes to have a high viscosity due to aggregation of pigment particles over time, exhibiting thixotropic properties. Such an increase in a viscosity and deficiency in flowability of a colored composition cause a problem on manufacturing and various problems on a product value. For example, formation of a filter segment of a color filter is generally performed by spin-coating a colored composition in which a pigment is dispersed in a pigment carrier containing a monomer and a resin, on a glass substrate. However, when a colored composition having a high viscosity and poor flowability is used, a coated film having a uniform thickness can not be obtained due to deteriorated spin coating properties and deteriorated leveling.

Since the target spectroscopic spectrum is not generally obtained by single pigment, each color pixel of RGB (red, green, blue) forming a color filter is formed by using a colored composition containing two or more kinds of pigments in many cases. However, different kinds of pigments easily cause heterogeneous aggregation, and when two or more kinds of pigments are contained, it is particularly difficult to obtain a stable colored composition. For example, a copper phthalocyanine blue pigment excellent in light resistance and heat resistance is generally used in a colored composition for use in forming a blue filter segment. However, since it is difficult to obtain a desired spectroscopic spectrum by a copper phthalocyanine blue pigment alone, a spectroscopic spectrum is adjusted by adding a violet pigment. For example, U.S. Pat. No. 6,280,890 B1 discloses a blue colorant consisting of a copper phthalocyanine pigment and a dioxazine violet pigment. The dioxazine violet pigment accounts for 0.5 to 7% by weight of the total weight of the blue colorant. However, when a dispersion of the violet pigment is mixed into a dispersion of the copper phthalocyanine blue pigment, balance of the dispersion system is lost in many cases. Thus, it is generally difficult to obtain a stable blue colored composition.

BRIEF SUMMARY OF THE INVENTION

An object of the present invention is to provide a blue colored composition for a color filter, which can form a color filter having a high luminance and a high contrast ratio and is excellent in flowability and various resistances, as well as a color filter having a high luminance and a high contrast ratio.

According to a first aspect of the present invention, there is provided a blue colored composition for a color filter, which comprises a pigment carrier comprising a transparent resin, a precursor thereof or a mixture thereof, a blue pigment having a specific surface area of 90 to 140 $m^2/g$, and a violet pigment having a specific surface area in a range of 100 to 150 m²/g, but having a greater specific surface area than that of the blue pigment used.

According to a second aspect of the present invention, there is provided a color filter comprising a filter segment formed from the blue colored composition of the present invention.

BRIEF DESCRIPTION OF THE SEVERAL VIEWS OF THE DRAWING

The single FIGURE is a exploded view schematically illustrating an apparatus for measuring a contrast ratio.

DETAILED DESCRIPTION OF THE INVENTION

First, a blue colored composition for a color filter of the present invention will be explained.

The blue colored composition for a color filter of the present invention comprises a pigment carrier comprising a transparent resin, a precursor thereof or a mixture thereof, a blue pigment having a specific surface area of 90 to 140 m²/g, and a violet pigment having a specific surface area in a range of 100 to 150 m²/g, but having a greater specific surface area than that of the blue pigment used. In the blue colored composition of the present invention, heterogeneous aggregation of the blue pigment and the violet pigment is not caused by controlling specific surface areas of the blue pigment and the violet pigment contained in the composition in specified ranges.

Since a pigment comprises a mixture of primary particles and secondary particles which are an aggregate of primary particles, when two or more kinds of pigments are blended, the aggregated state is influenced by a specific surface area of each pigment.

Conventionally, when two or more kinds of pigments are blended, heterogeneous aggregation of pigments results in reduction in a luminance and a contrast ratio as a color filter. In the present invention, by using, in the blue colored composition, a violet pigment, which is used for toning, having a specific surface greater than that of the blue pigment used, heterogeneous aggregation of the blue pigment and the violet pigment is suppressed minimum, and a high luminance and a high contrast ratio as a color filter are attained. When the specific surface area of the violet pigment is smaller than the specific surface area of the blue pigment used, heterogeneous aggregation of the blue pigment and the violet pigment is caused, and a luminance and a contrast ratio of the resulting color filter are reduced.

The specific surface area of the blue pigment contained in the blue colored composition of the present invention is 90 to 140 m²/g, and the specific surface area of the violet pigment is 100 to 150 m²/g.

When the specific surface area of the blue pigment and that of the violet pigment are lower than each lower limit, only a color filter having a low luminance and a low contrast ratio is obtained. When the specific surface area of the blue pigment and that of the violet pigment are higher than each upper limit, the blue pigment and the violet pigment are heterogeneously aggregated. Thus, it becomes difficult to retain stability as a colored composition and secure flowability, and, at the same time, properties such as a luminance and a contrast ratio of a color filter are extremely deteriorated.

An average primary particle diameter of each of the blue pigment and the violet pigment contained in the blue colored composition of the present invention is preferably in a range of 0.005 to 0.05 μm, more preferably 0.005 to 0.03 μm. When the average primary particle diameter of each of the blue and violet pigments is smaller than 0.005 μm, pigment particles tend to aggregate. When the average primary particle diameter is larger than 0.05 μm, there is a tendency that it becomes difficult to attain the target specific surface areas, and thus a high contrast ratio can not be attained.

As the blue pigment and the violet pigment contained in the blue colored composition of the present invention, organic or inorganic pigments can be used singly or in combination. However, it is particularly preferable to use organic pigments having high color developing properties, and high heat resistance. In the blue colored composition of the present invention, a blue dye or a violet dye other than the pigment can be used jointly. Examples of a dye other than the pigment include a dyestuff and a natural dye.

Examples of the blue pigment and the violet pigment usable in the blue colored composition of the present invention are shown below with a color index number.

As the blue pigment, for example, C. I. Pigment Blue 15, 15:1, 15:2, 15:3, 15:4, 15:6, 16, 22, 60 and 64 can be used. Among them, C. I. Pigment Blue 15:6, which is a copper phthalocyanine pigment, is preferable.

As the violet pigment, for example, C. I. Pigment Violet 1, 19, 23, 27, 29, 30, 32, 37, 40, 42 or 50 can be used. Among them, C. I. Pigment Violet 23, which is a dioxazine pigment, is preferable.

A content of the violet pigment is preferably 0.005 to 50% by weight, more preferably 0.005 to 40% by weight, based on the total amount of the pigment (total weight of the blue pigment and the violet pigment).

As means for controlling a specific surface area of a pigment, there are a method in which a pigment is mechanically grinded to control a specific surface area (called grinding method), a method in which a pigment dissolved in a good solvent is added to a poor solvent to precipitate a pigment having a desired specific surface area (called precipitation method), and a method in which a pigment having a desired specific surface area is obtained upon its synthesis (called synthesis precipitation method). A specific surface area can be controlled by selecting an appropriate method for individual pigments depending on a method of synthesizing a pigment used, chemical properties of the pigment, and the like.

The methods of controlling a specific surface area will be explained in more detail below, and any of these methods may be used as a method of controlling a specific surface area of pigments contained in the colored composition of the present invention.

The grinding method is a method in which a pigment is mechanically kneaded together with a grinding agent such as a water-soluble inorganic salt such as sodium chloride as well as a water-soluble organic solvent which does not dissolve the grinding agent by using a ball mill, a sand mill or a kneader (hereinafter, this step is referred to as salt milling). The inorganic salt and the organic solvent are removed by washing with water, and the pigment thus prepared is dried to obtain a pigment having a desired specific surface area. However, crystals of a pigment is grown by the salt milling treatment in some cases. Therefore, it is effective to prevent the crystal growth by adding a solid resin or a pigment dispersant, which is at least partially dissolved in the organic solvent, at the time of the salt milling treatment.

With regard to a ratio of the pigment and the inorganic salt, when a proportion of the inorganic salt becomes larger, effect of finely-dividing the pigment becomes better, but since an amount of the pigment treated becomes small, productivity is reduced. Generally, it is suitable to use the organic salt in an amount of 1 to 30 parts by weight, preferably 2 to 20 parts by weight per 1 part by weight of the pigment. The water-soluble organic solvent is added in order to make a pigment and an inorganic salt a uniform mass, and the solvent is usually used in an amount of 50 to 300% by weight of the weight of the pigment depending on the ratio of the pigment and the inorganic salt.

The salt milling will be explained further specifically. A small amount of a water-soluble organic solvent as a wetting agent is added to a mixture of a pigment and a water-soluble inorganic salt. The resultant mixture is vigorously kneaded with, e.g., a kneader. The kneaded mixture is placed into water, and stirred with, e.g., a high speed mixer to obtain a slurry. Then, this slurry is filtered, washed with water and dried, affording a pigment having a desired specific surface area.

The precipitation method is a method in which a pigment is dissolved in an appropriate good solvent, and the resultant solution is mixed a poor solvent to precipitate a pigment having a desired specific surface area. The magnitude of the specific surface area can be controlled by, e.g., a kind and an amount of the solvent, a precipitation temperature, and a precipitation rate. Generally, a pigment is difficult to dissolve in a solvent and a usable solvent is limited. However, for example, a strong acidic solvent such as a concentrated sulfuric acid, polyphosphoric acid or chlorosulfonic acid, or a basic solvent such as liquid ammonia or a solution of sodium methylate in dimethylformamide is known as a good solvent for the pigment.

A representative example of the precipitation method is an acid pasting method, in which a solution of a pigment in an acidic solvent is poured into other solvent to re-precipitate the pigment to obtain fine particles of the pigment. Industrially, from a viewpoint of a cost, a method in which a solution of a pigment in sulfuric acid is poured into water is generally employed. A concentration of sulfuric acid is not particularly limited, but 95 to 100% by weight is preferable. An amount of sulfuric acid used relative to a pigment is not particularly limited. However, when the amount is small, a viscosity of the pigment solution is increased, and handling becomes difficult. Conversely, when the amount is too large, efficiency of treating a pigment is reduced. Thus, it is preferable to use sulfuric acid in an amount 3 to 10-fold the weight of the pigment. Note that it is not necessary that the pigment is completely dissolved. A temperature at dissolution is preferably 0 to 50° C. When the temperature is lower than 0° C., sulfuric acid may be frozen, and solubility of the pigment is reduced. When the temperature is too high, a side reaction easily occurs. A temperature of water into which a solution of a pigment in sulfuric acid is poured is preferably 1 to 60° C. When pouring is initiated at a temperature higher than 60° C., water may boil by heat of dissolution sulfuric acid, and working becomes dangerous. When the temperature is lower than 1° C., the pigment solution may be frozen. A time for pouring is preferably 0.1 to 30 minutes per 1 part of a pigment. There is a tendency that as a time becomes longer, the specific surface area becomes smaller.

The control of the specific surface area of the pigments contained in the blue colored composition of the present invention can be effected, while a degree of particle size adjustment of the pigment is taken into consideration, by a combination of the precipitation method such as an acid pasting method with the grinding method such as a salt milling method. In this case, conveniently, flowability as a pigment dispersion can be also secured.

During the salt milling or acid pasting, in order to prevent aggregation of the pigment accompanied with control of the specific surface area, a dispersing aid such as a derivative described below, a resin-type pigment dispersing agent, or a surfactant may be additionally used. By performing specific surface area control in the presence of two or more kinds of pigments, even a pigment, which is difficult to be dispersed singly, can be prepared as a stable dispersion.

As a special precipitation method, there is a leuco method. When a vat pigment such as a flavanthrone, perynone, perylene or indanthrone pigment is reduced with alkaline hydrosulfite, the quinone group becomes a sodium salt of hydroquinone (leuco compound), and the pigment becomes water-soluble. By adding an appropriate oxidizing agent to this aqueous solution to oxidize the pigment, a pigment which is insoluble in water and has a great specific surface area can be precipitated.

The synthesis precipitation method is a method in which a pigment having a desired specific surface area is precipitated upon its synthesis. However, when the produced fine pigment is taken out from a solvent, filtration which is a general separating method becomes difficult unless pigment particles are aggregated to form great secondary particles. Therefore, this synthesis precipitation method is usually applied to an azo pigment which is synthesized in an aqueous system where secondary aggregation easily occurs.

Further, a specific surface area of a pigment may be controlled by dispersing a pigment with, e.g., a high speed sand mill for a long time (so-called dry milling method in which a pigment is dry-grinded in the absence of a grinding aid and an organic liquid), thereby increasing a specific surface area of a pigment, and at the same time, dispersing the pigment.

For preventing aggregation of pigments to maintain the state where a pigment is finely dispersed, and preparing a color filter having a high luminance, a high contrast ratio, and a high color purity, it is preferable that the blue colored composition of the present invention contains at least one derivative selected from a pigment derivative, an anthraquinone derivative, an acridone derivative and a triazine derivative, each having at least one basic group (hereinafter, referred to as "specific basic group" in some cases) selected from a basic group of the following formula (1), a basic group of the following formula (2), a basic group of the following formula (3) and a basic group of the following formula (4).

A content of the derivative having the specific basic group is preferably 0.001 to 40% by weight, more preferably 1 to 20% by weight, based on the total weight of the blue pigment and the violet pigment.

Formula (1):

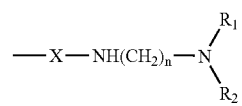

Formula (2):

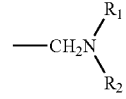

Formula (3):

-continued

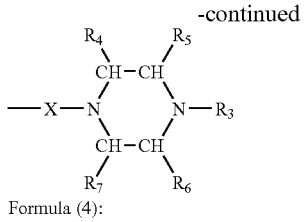

Formula (4):

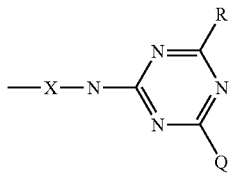

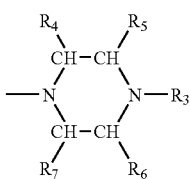

wherein $R_3$ to $R_7$ are as defined above.

Q represents a hydroxy group, an alkoxyl group, a substituent represented by the above formula (5) or a substituent represented by the above formula (6). Q is preferably a substituent represented by the above formula (5).

Examples of an organic pigment constituting the pigment derivative having the specific basic group include a diketopyrropyrrole pigment; an azo pigment such as a monoazo, bisazo or polyazo pigment; a phthalocyanine pigment; an anthraquinone pigment such as diaminodianthraquinone, anthrapyrimidine, flavanthrone, anthanthrone, indanthrone, pyranthrone, or violanthrone; a quinacridone pigment; a dioxazine pigment; a perynone pigment; a perylene pigment; a thioindigo pigment; an isoindoline pigment; an isoindolinone pigment; a quinophthalone pigment; a threne pigment; and a metal complex pigment. Alternatively, the pigments used in the colored composition of the present invention shown above may be used.

The nthraquinone and acridone respectively constituting the anthraquinone derivative having the specific basic group and the acridone derivative having the specific basic group are anthraquinone and acridone optionally having a substituent such as an alkyl group such as a methyl group or an ethyl group; an amino group; a nitro group; a hydroxy group; an alkoxy group such as a methoxy group or an ethoxy group; or halogen such as chlorine, respectively.

The triazine constituting the triazine derivative having the specific basic group is 1,3,5-triazine optionally having a substituent such as an alkyl group such as a methyl group or an ethyl group; an amino group or an alkylamino group such as a dimethylamino group, a diethylamino group or a dibutylamino group; a nitro group; a hydroxy group; an alkoxy group such as a methoxy group, an ethoxy group or a butoxy group; halogen such as chlorine; a phenyl group optionally substituted with a methyl group, a methoxy group, an amino group, a dimethylamino group or a hydroxy group; or a phenylamino group optionally substituted with a methyl group, an ethyl group, a methoxy group, an ethoxy group, an amino group, a dimethylamino group, a diethylamino group, a nitro group or a hydroxy group.

The pigment derivative, athraquinone derivative, and acridone derivative each having the specific basic group can be synthesized through various synthesis routes. For example, they can be obtained by introducing a substituent represented by the following formulas (7) to (10) into the organic pigment, anthraquinone or acridone, and reacting an amine component which reacts with the substituent to form the specific basic group represented by the general formulas (1) to (4), for example, N,N-dimethylaminopropylamine, N-methylpiperazine, diethylamine or 4-[4-hydroxy-6-[3-(dibutylamino)propylamino]-1,3,5-triazin-2-ylamino] aniline.

In the formulas (1) to (4), X represents —SO$_2$—, —CO—, —CH$_2$NHCOCH$_2$—, —CH$_2$— or a single bond. X is preferably —SO$_2$— or a single bond.

n represents an integer of 1 to 10, preferably 1 to 3.

$R_1$ and $R_2$ represent independently an unsubstituted or substituted alkyl group having 1 to 36 carbon atoms, an unsubstituted or substituted alkenyl group having 2 to 36 carbon atoms, or an unsubstituted or substituted phenyl group, or $R_1$ and $R_2$ are taken together to form an unsubstituted or substituted heterocycle containing further a nitrogen atom, an oxygen atom or a sulfur atom. Each of $R_1$ and $R_2$ is preferably an unsubstitued or substituted alkyl group having 1 to 5 carbon atoms.

$R_3$ represents an unsubstituted or substituted alkyl group having 1 to 36 carbon atoms, an unsubstituted or substituted alkenyl group having 2 to 36 carbon atoms, or an unsubstituted or substituted phenyl group. $R_3$ is preferably an unsubstitued or substituted alkyl group having 1 to 4 carbon atoms.

$R_4$, $R_5$, $R_6$ and $R_7$ represent independently a hydrogen atom, an unsubstituted or substituted alkyl group having 1 to 36 carbon atoms, an unsubstituted or substituted alkenyl group having 2 to 36 carbon atoms, or an unsubstituted or substituted phenyl group, respectively. Each of $R_4$, $R_5$, $R_6$ and $R_7$ is preferably an unsubstitued or substituted alkyl group having 1 to 4 carbon atoms.

Y represents —NR$_8$—Z—NR$_9$— or a single bond.

$R_8$ and $R_9$ represent independently a hydrogen atom, an unsubstituted or substituted alkyl group having 1 to 36 carbon atoms, an unsubstituted or substituted alkenyl group having 2 to 36 carbon atoms, or an unsubstitued or substituted phenyl group. Each of $R_8$ and $R_9$ is preferably a hydrogen atom.

Z represents an unsubstituted or substituted alkylene group having 1 to 36 carbon atoms, an unsubstituted or substituted alkenylene group having 2 to 36 carbon atoms, or an unsubstituted or substituted phenylene group. Z is preferably an unsubstitued or substituted phenylene group.

R represents a substituent represented by the formula (5):

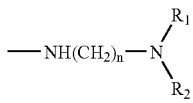

where n, $R_1$ and $R_2$ are as defined above, or a substituent represented by the formula (6):

Formula (7): —SO$_2$Cl

Formula (8): —COCl

Formula (9): —CH$_2$NHCOCH$_2$Cl

Formula (10): —CH$_2$Cl

When the organic pigment is an azo pigment, an azo pigment derivative having a basic group may be prepared by introducing the substituent represented by the general formulas (1) to (4) into a diazo component or a coupling component in advance, and thereafter, performing a coupling reaction.

Likewise, the triazine derivative having the specific basic group can be synthesized through various synthesis routes. For example, cyanuric chloride can be used as a starting raw material. The triazine derivative having the specific basic group can be synthesized by reacting at least one chlorine of cyanuric chloride with an amine component which forms the basic group represented by the general formulas (1) to (4), for example, N,N-dimethylaminopropylamine or N-methylpiperazine, and reacting the remaining chlorines of cyanuric chloride with various amines or alcohols, etc.

Examples of the amine component used for forming the specific basic group include dimethylamine, diethylamine, N,N-ethylisopropylamine, N,N-ethylpropylamine, N,N-methylbutylamine, N,N-methylisobutylamine, N,N-butylethylamine, N,N-tert-butylethylamine, diisopropylamine, dipropylamine, N,N-sec-butylpropylamine, dibutylamine, di-sec-butylamine, diisobutylamine, N,N-isobutyl-sec-butylamine, diamylamine, diisoamylamine, dihexylamine, di(2-ethylhexyl)amine, dioctylamine, N,N-methyloctadecylamine, didecylamine, diallylamine, N,N-ethyl-1,2-dimethylpropylamine, N,N-methylhexylamine, dioleylamine, distearylamine, N,N-dimethylaminomethylamine, N,N-dimethylaminoethylamine, N,N-dimethylaminoamylamine, N,N-dimethylaminobutylamine, N,N-diethylaminoethylamine, N,N-diethylaminopropylamine, N,N-diethylaminohexylamine, N,N-diethylaminobutylamine, N,N-diethylaminopentylamine, N,N-dipropylaminobutylamine, N,N-dibutylaminopropylamine, N,N-dibutylaminoethylamine, N,N-dibutylaminobutylamine, N,N-diisobutylaminopentylamine, N,N-methyl-laurylaminopropylamine, N,N-ethyl-hexylaminoethylamine, N,N-distearylaminoethylamine, N,N-dioleylaminoethylamine, N,N-distearylaminobutylamine, piperidine, 2-pipecoline, 3-pipecoline, 4-pipecoline, 2,4-lupetidine, 2,6-lupetidine, 3,5-lupetidine, 3-piperidinemethanol, pipecolinic acid, isonipecotic acid, methyl isonipecotate, ethyl isonipecotate, 2-piperidineethanol, pyrrolidine, 3-hydroxypyrrolidine, N-aminoethylpiperidine, N-aminoethyl-4-pipecoline, N-aminoethylmorphorine, N-aminopropylpiperidine, N-aminopropyl-2-pipecoline, N-aminopropyl-4-pipecoline, N-aminopropylmorphorine, N-methylpiperazine, N-butylpiperazine, N-methylhomopiperazine, 1-cyclopentylpiperazine, 1-amino-4-methylpiperazine, and 1-cyclopentylpiperazine.

Examples of the derivative having the specific basic group will be shown below, but are not limited thereto. These derivatives can be used singly or in combination.

Derivative 1:

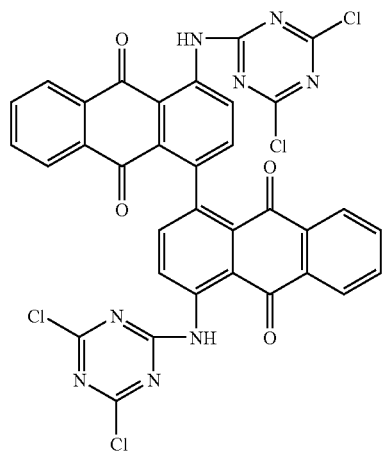

Derivative 2:
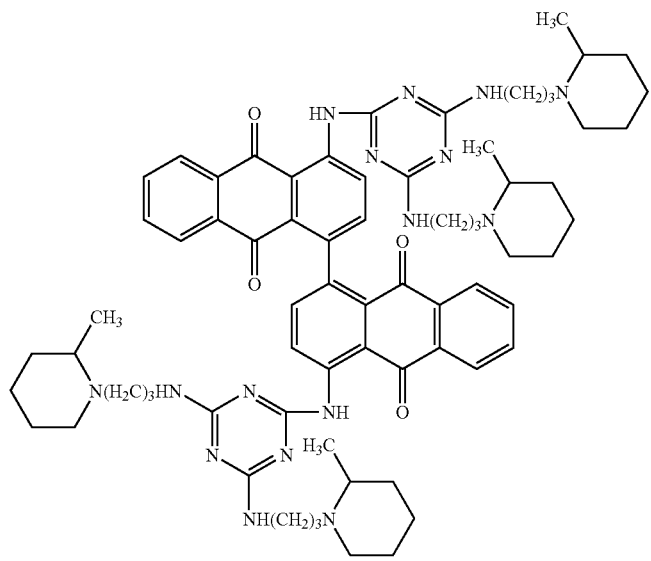
Derivative 3:
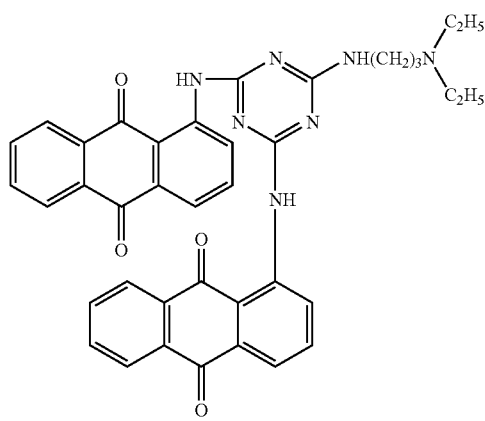
Derivative 4:
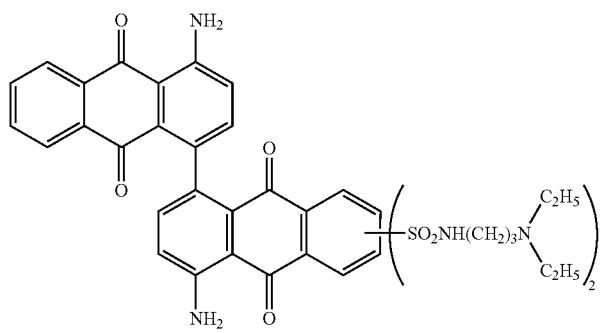

-continued
Derivative 5:
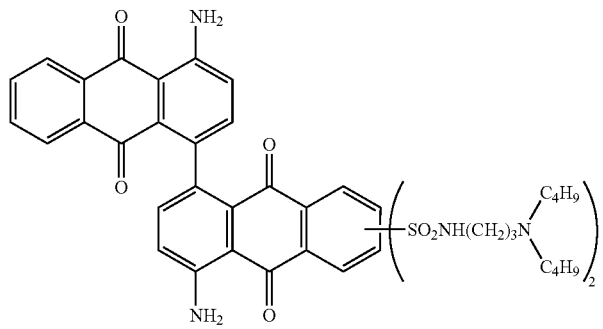
Derivative 6:
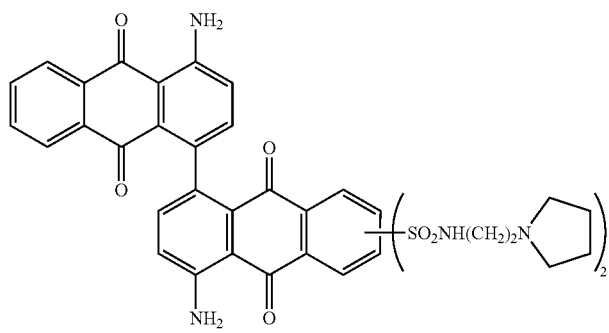
Derivative 7:
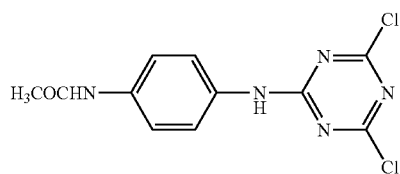
Derivative 8:
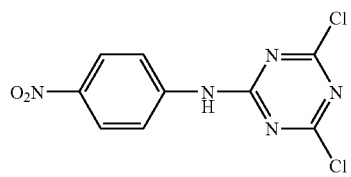
Derivative 9:
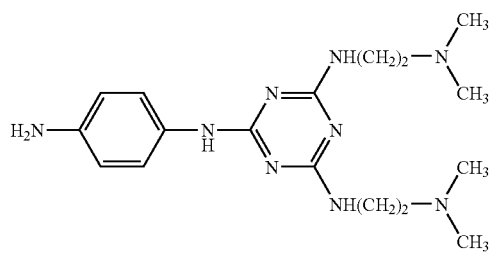

-continued
Derivative 10:
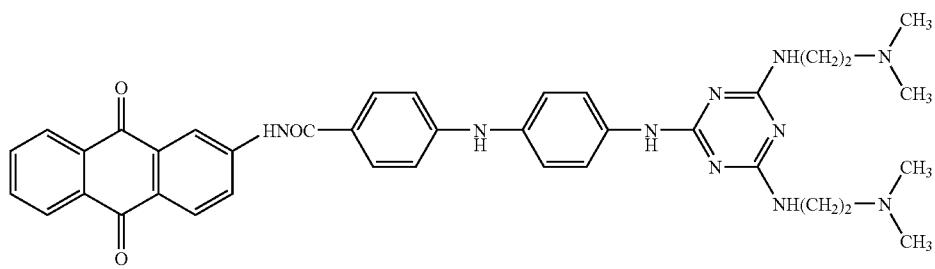
Derivative 11:
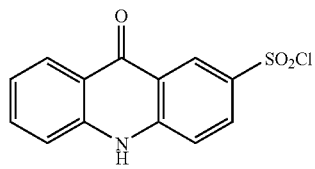
Derivative 12:
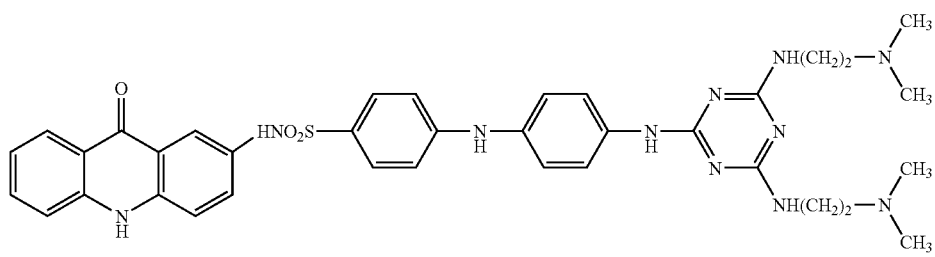
Derivative 13:
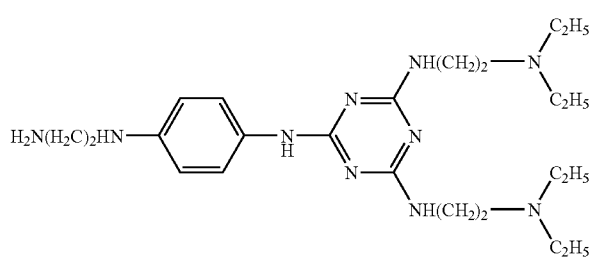
Derivative 14:
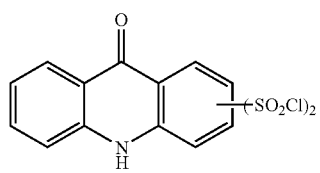
Derivative 15:
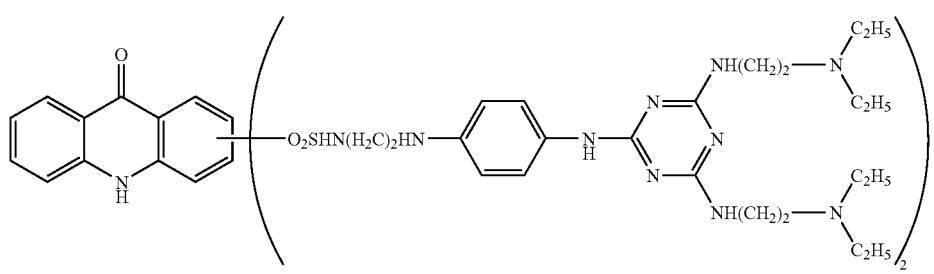

-continued
Derivative 16:
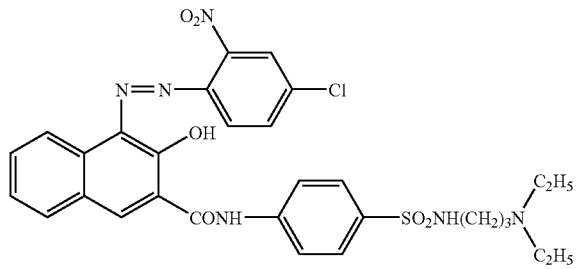
Derivative 17:
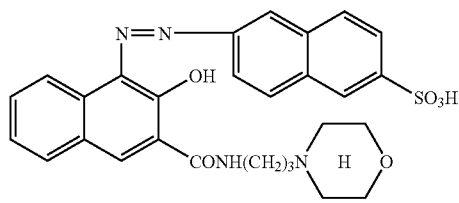
Derivative 18:
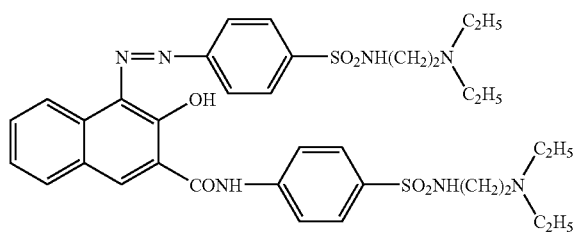
Derivative 19:
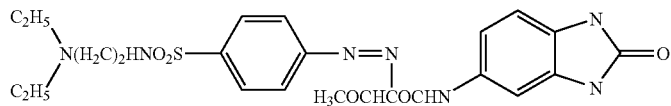
Derivative 20:
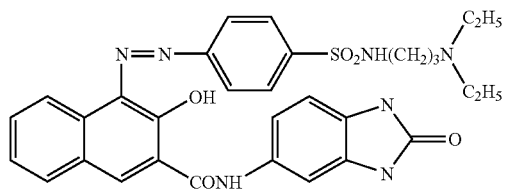
Derivative 21:
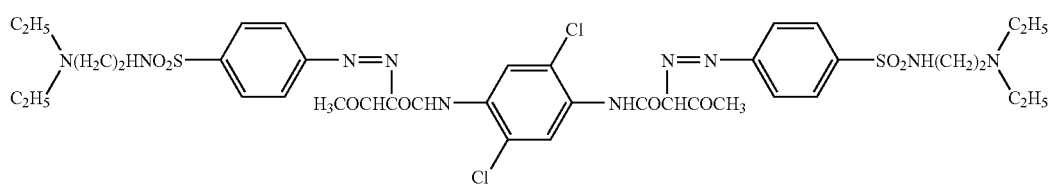
Derivative 22:
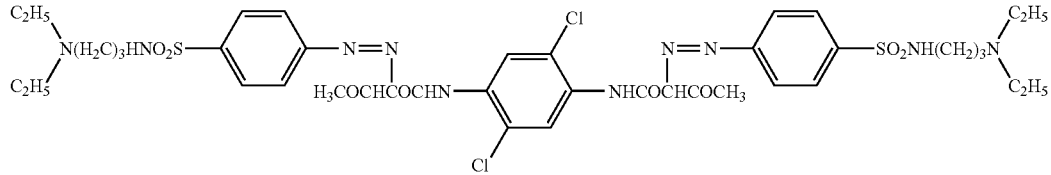

-continued
Derivative 23:
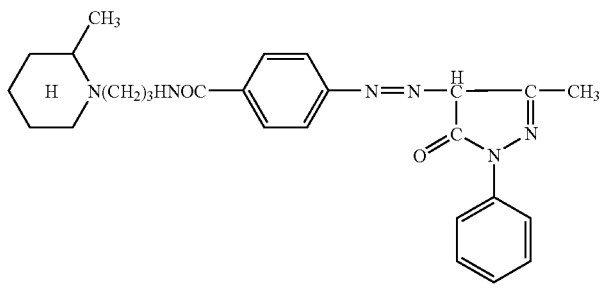
Derivative 24:
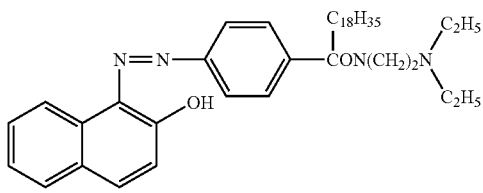
Derivative 25:
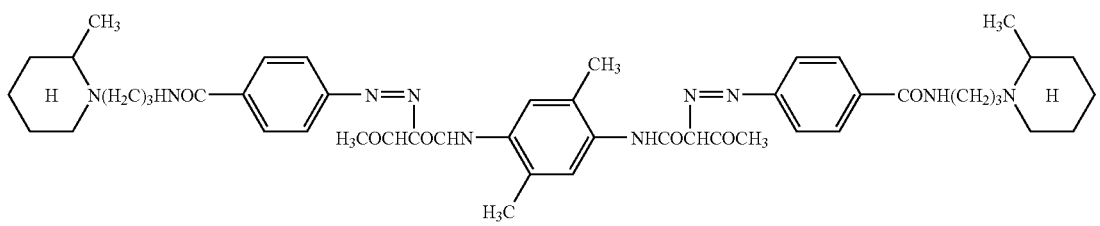
Derivative 26:
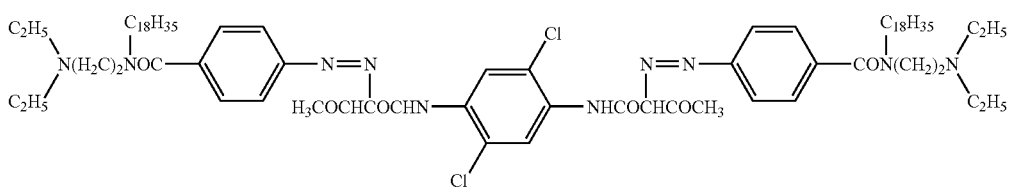
Derivative 27:
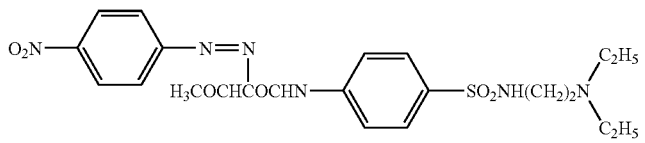
Derivative 28:
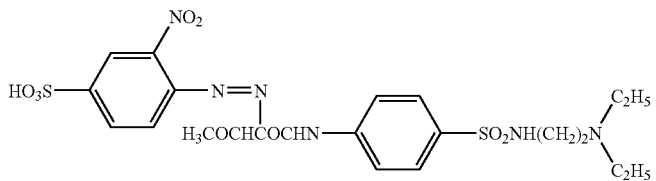

-continued
Derivative 29:
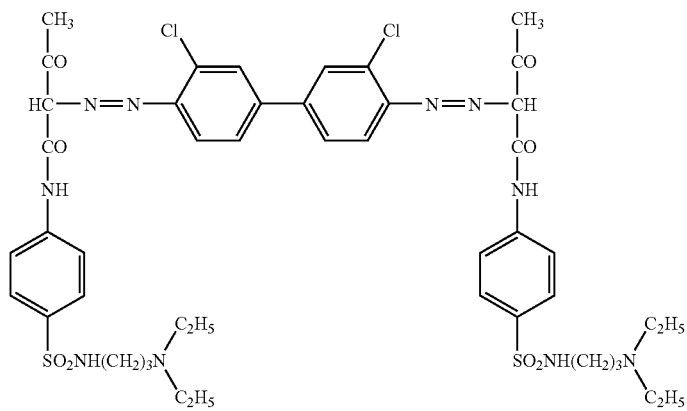
Derivative 30:
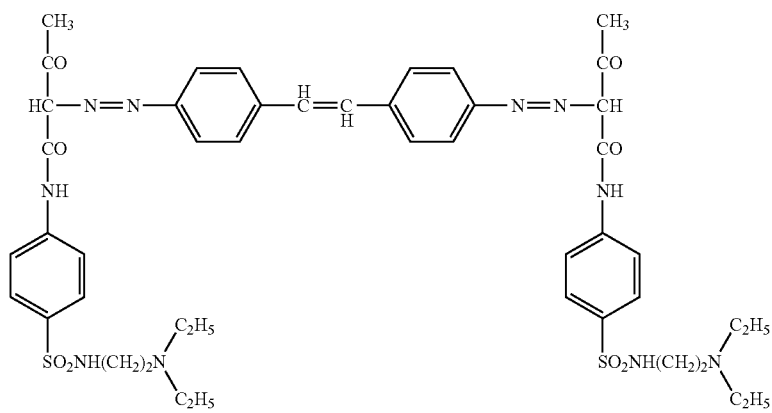
Derivative 31:
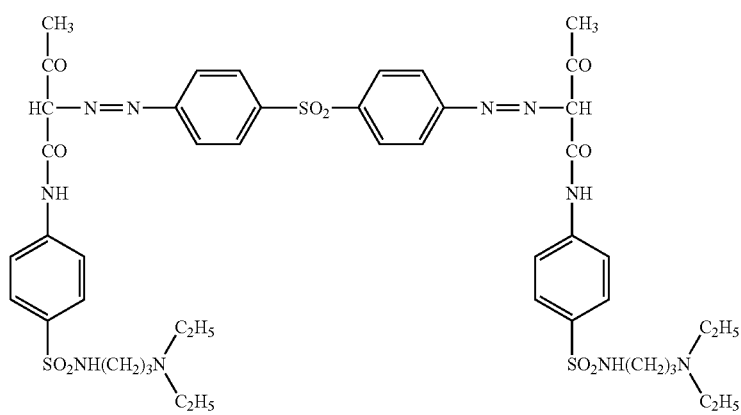
Derivative 32:
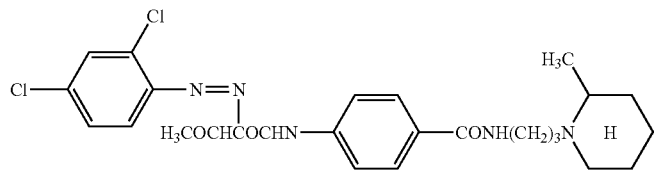

-continued
Derivative 33:
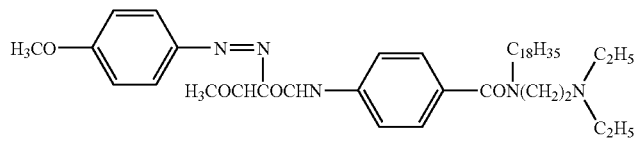
Derivative 34:
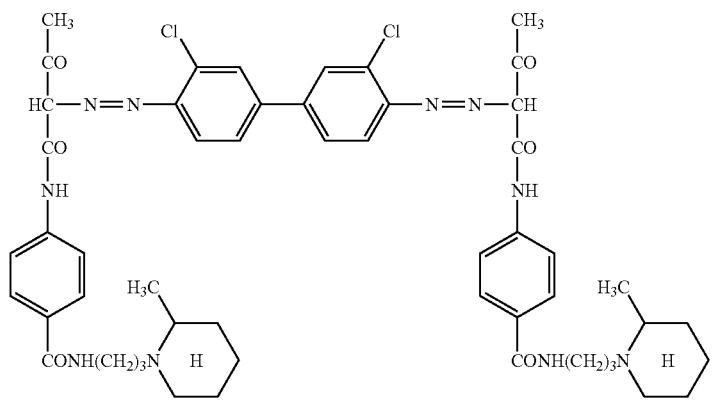
Derivative 35:
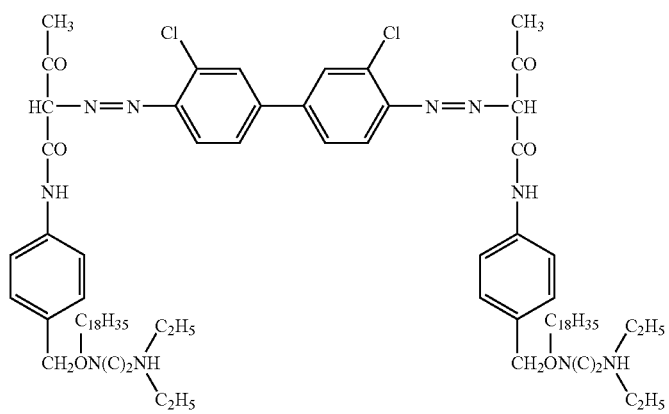
Derivative 36:
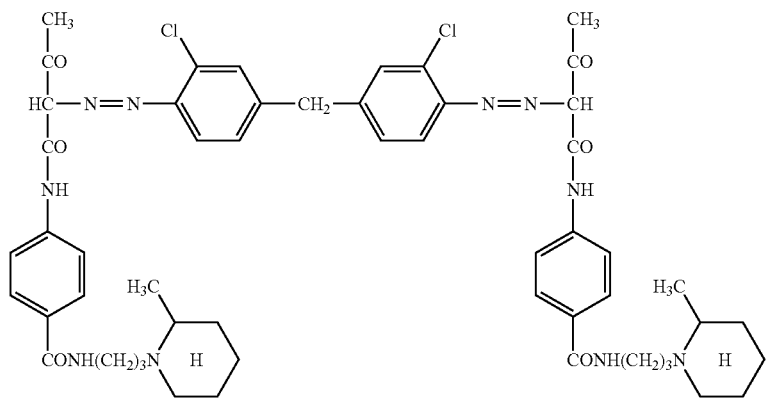

Derivative 37:
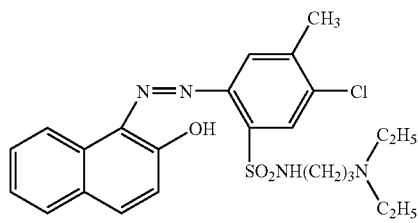
Derivative 38:
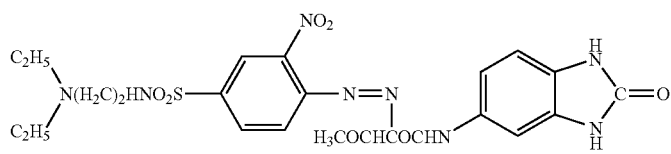
Derivative 39:
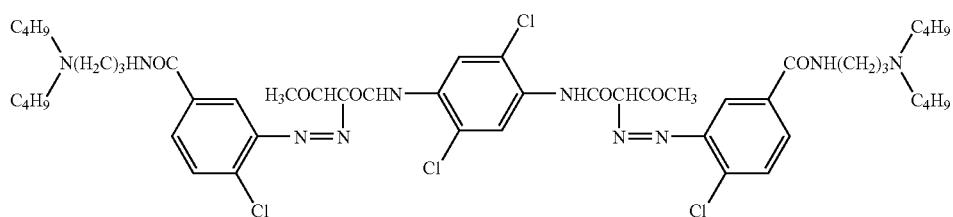
Derivative 40:
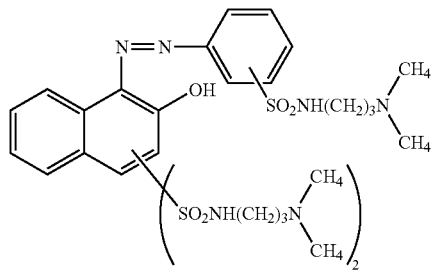
Derivative 41:
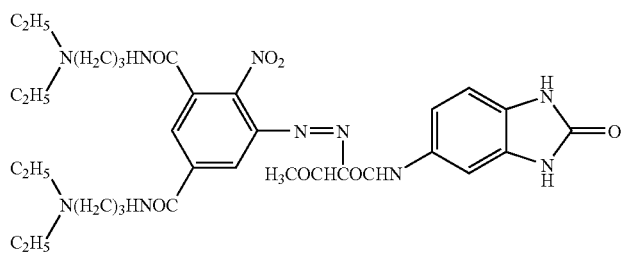
Derivative 42:
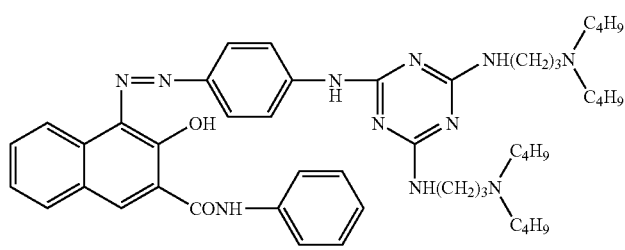

-continued
Derivative 43:
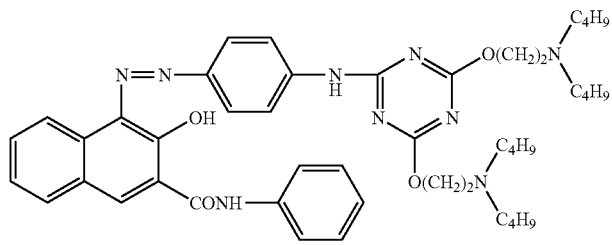
Derivative 44:
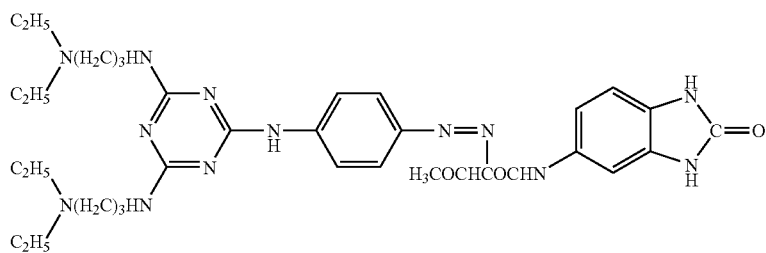
Derivative 45:
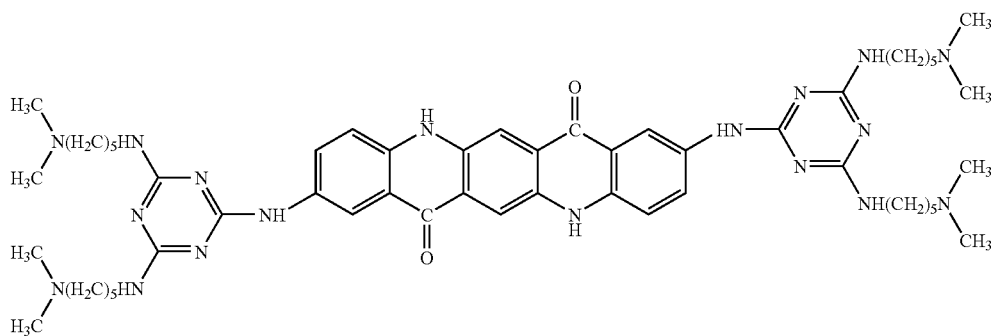
Derivative 46:
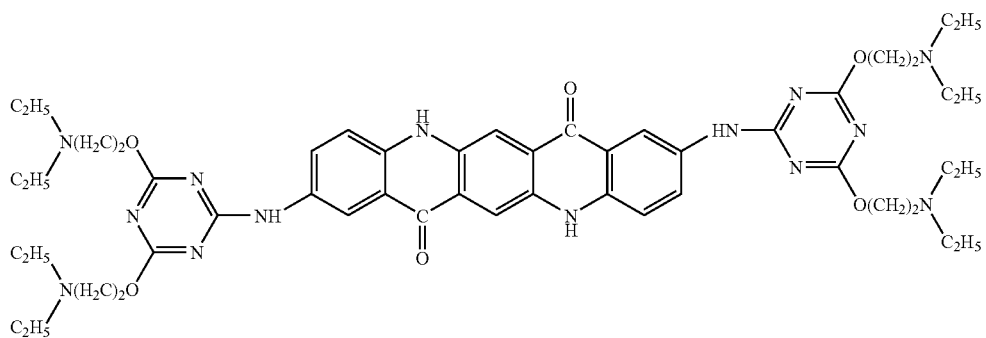
Derivative 47:
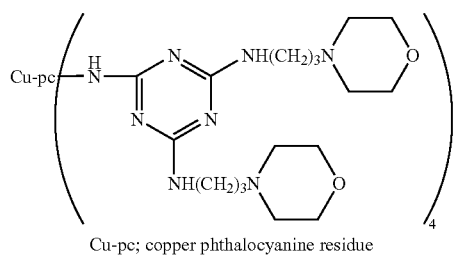
Cu-pc; copper phthalocyanine residue Derivative 48

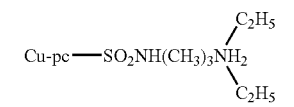

Cu-pc; copper phthalocyanine residue

Derivative 49:

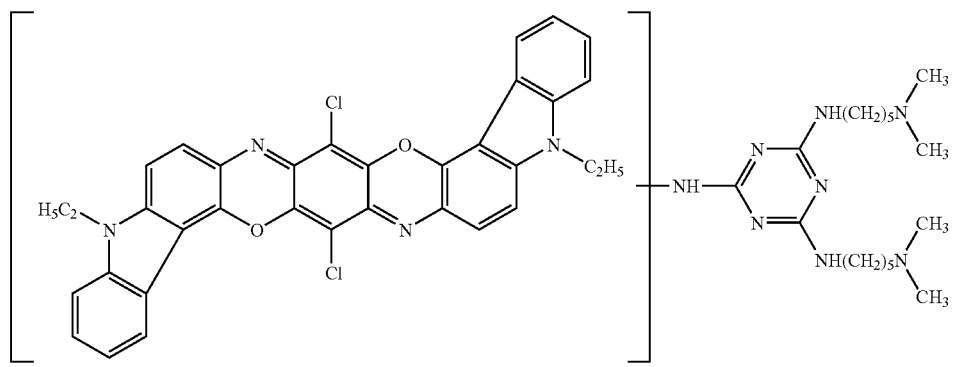

Derivative 50:

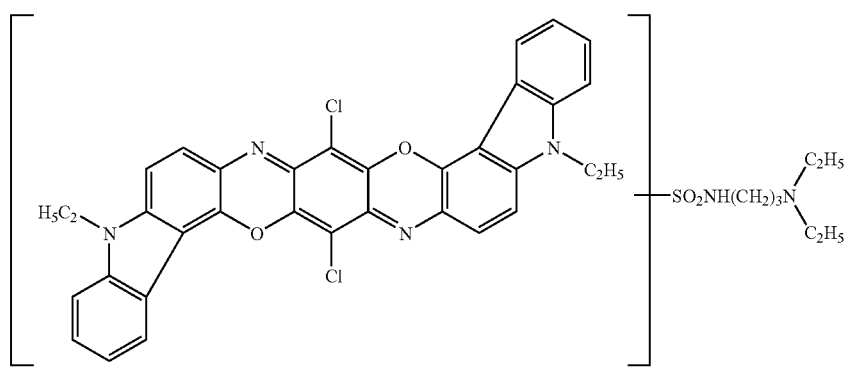

Derivative 51:

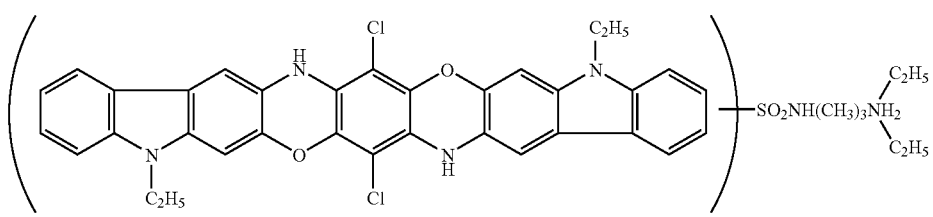

The pigment carrier, in which the pigments contained in the blue colored composition of the present invention are dispersed, is constituted by a transparent resin, its precursor or a mixture thereof. The transparent resin exhibits a light transmittance of preferably 80% or more, more preferably 95% or more with respect to the whole visible wavelengths of 400 to 700 nm. The transparent resin includes a thermoplastic resin, a thermosetting resin and an active energy beam curable resin. Its precursor includes a monomer and an oligomer which produce the transparent resin upon curing by irradiation of active energy beam, and these can be used singly or in combination. The pigment carrier is used in an amount of, preferably 100 to 700%, more preferably 100 to 400%, based on the total weight of the blue and violet pigments of the invention.

When the blue colored composition of the invention is cured by ultraviolet irradiation, a photopolymerization initiator is added to the composition.

Examples of the thermoplastic resin constituting the pigment carrier include a butyral resin, a styrene-maleic acid copolymer, a chlorinated polyethylene, a chlorinated polypropylene, a polyvinyl chloride, a vinyl chloride-vinyl acetate copolymer, a polyvinyl acetate, a polyurethane resin, a polyester resin, an acrylic resin, an alkyd resin, a styrene resin, a polyamide resin, a rubber resin, a cyclized rubber resin, a cellulose, a polyethylene (including HDPE and LDPE), a polybutadiene, and a polyimide resin. Examples of the thermosetting resin include an epoxy resin, a benzoguanamine resin, a rosin modified maleic acid resin, a rosin modified fumaric acid resin, a melamine resin, a urea resin, and a phenolic resin.

Examples of the active energy beam curable resin include resins prepared by reacting a linear polymer having a reactive substituent such as hydroxyl, carboxyl or amino group with a (meth)acrylic compound having a reactive group such as isocyanato, aldehydo or epoxy group, or with cinnamic acid, thereby introducing the resultant (meth) acryloyl or styryl group into the linear polymer. Also, use may be made of a linear polymer having an acid anhydride, such as a styrene-maleic anhydride copolymer or a α-olefin-maleic anhydride copolymer which have been half esterified with a (meth)acrylic compound having a hydroxyl group, such as a hydroxyalkyl (meth)acrylate.

Examples of the monomer and oligomer constituting the pigment carrier include various acrylate esters and methacrylate esters such as methyl (meth)acrylate, ethyl (meth) acrylate, 2-hydroxyethyl (meth)acrylate, 2-hydroxypropyl (meth)acrylate, cyclohexyl (meth) acrylate, β-carboxyethyl (meth) acrylate, polyethylene glycol di(meth)acrylate, 1,6-hexanediol di(meth)acrylate, triethylene glycol di(meth) acrylate, tripropylene glycol di(meth)acrylate, trimethylolpropane tri(meth)acrylate, pentaerythrytol tri(meth)acrylate, 1,6-hexanediol diglycidyl ether di(meth)acrylate, bisphenol A diglycidyl ether di(meth)acrylate, neopentyl glycol diglycidyl ether di(meth)acrylate, dipentaerythrytol hexa(meth) acrylate, tricyclodecanyl (meth)acrylate, ester (meth)acrylate, (meth)acrylate of methylolated melamine, epoxy (meth)acrylate, and urethane acrylate; (meth)acrylic acid, styrene, vinyl acetate, hydroxyethyl vinyl ether, ethylene glycol divinyl ether, pentaerythrytol trivinyl ether, (meth) acrylamide, N-hydroxymethyl (meth)acrylamide, N-vinyl formamide, and acrylonitrile. These can be used singly or in combination.

Examples of the photopolymerization initiator include acetophenone photopolymerization initiators such as 4-phenoxydichloroacetophenone, 4-t-butyl-dichloroacetophenone, diethoxyacetophenone, 1-(4-isopropylphenyl)-2-hydroxy-2-methylpropan-1-one, 1-hydroxycyclohexyl phenyl ketone, 2-benzyl-2-dimethylamino-1-(4-morphorinophenyl)-butan-1-one and 2-methyl-1-[4-(methylthio)phenyl]-2-morpholinopropan-1-one; benzoin photopolymerization initiators such as benzoin, benzoin methyl ether, benzoin ethyl ether, benzoin isopropyl ether and benzyl dimethyl ketal; benzophenone photopolymerization initiators such as benzophenone, benzoylbenzoic acid, methyl benzoylbenzate, 4-phenylbenzophenone, hydroxybenzophenone, acrylated benzophenone and 4-benzoyl-4'-methyldiphenyl sulfide; thioxanthone photopolymerization initiators such as thioxanthone, 2-chlorothioxanthone, 2-methylthioxanthone, isopropylthioxanthone and 2,4-diisopylthioxanthone; triazine photopolymerization initiators such as 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-piperonyl-4,6-bis(trichloromethyl)-s-triazine, 2,4-bis(trichloromethyl)-6-styryl-s-triazine, 2-(naphtho-1-yl)-4,6-bis(trichloromethyl)-s-triazine, 2-(4-methoxy-naphtho-1-yl)-4,6-bis (trichloromethyl)-s-triazine, 2,4-trichloromethyl (piperonyl)-6-triazine and 2,4-trichloromethyl(4'-methoxystyryl)-6-triazine; borate photopolymerization initiators, carbazole photopolymerization initiators, and imidazole photopolymerization initiators. The photopolymerization initiator can be used in an amount of 5 to 200%, more preferably 10 to 150%, based on the total weight of the blue and violet pigments of the invention.

The photopolymerization initiator can be used singly or in combination. However, as an sensitizer, compounds such as α-acyloxy ester, acylphosphine oxide, methylphenyl glyoxylate, benzyl, 9,10-phenanthlene quinine, camphor quinone, ethylanthraquinone, 4,4'-diethylisophthalophenone, 3,3',4,4'-tetra(t-butylperoxycarbonyl)benzophenone and 4,4'-diethylaminobenzophenone can be additionally used. The sensitizer can be used in an amount of 0.1 to 30% based on the weight of the photopolymerization initiator.

The blue colored composition of the present invention can be prepared in the form of a solvent developing type or alkali developing type blue colored resist. The resist contains the blue and violet pigments dispersed in a pigment carrier comprising the above-noted thermoplastic resin, thermosetting resin or active energy beam curable resin. The resist can be prepared by finely dispersing the blue colorant consisting of the blue and violet pigments, together with the photopolymerization initiator as required, in the pigment carrier by various dispersing means such a three-roll mill, a two-roll mill, a sand mill, a kneader or an attiritor. Also, the blue colored composition can be prepared dispersing the blue pigment and the violet pigment separately in respective pigment carrier to prepare dispersions, which are then mixed together.

When the pigments are dispersed in the pigment carrier, a dispersing aid such as a resin type pigment dispersing agent, a dye derivative or a surfactant can be used. Since the dispersing aid is superior in dispersing the pigments and has great effect to prevent the re-agglomeration of the pigments after dispersion, a color filter superior in transparency is obtained when the colored composition, in which the pigments are dispersed in the pigment carrier using the dispersing aid, is used. The dispersing aid can be used in an amount of, preferably, 0.1 to 40%, more preferably 0.1 to 30%, based on the total weight of the blue and violet pigments.

The resin type pigment dispersing agent has a portion with an affinity to pigments which portion has a property of adsorbing on the pigments, and a portion compatible with a pigment careeer, and functions to stabilize the dispersion of pigments in the pigment carrier by being adsorbed on the pigments. The resin type pigment dispersing agent includes an oily dispersing agent including a polyurethane, a polycarboxylic acid ester such as a polyacrylate, an unsaturated polyamide, a polycarboxylic acid, a (partial) amine salt of a polycarboxylic acid, an ammonium salt of a polycarboxylic acid, an alkylamine salt of a polycarboxylic acid, a polysiloxane, a long chain polyaminoamide phosphate salt, an ester of hydroxyl group-containing polycarboxylic acid and a modified product thereof, an amide formed by reaction of a poly(lower alkyleneimine) with a polyester having a free carboxyl group, or a salt thereof. Further, a water soluble resin or polymeric compound such as a (meth)acrylic acid-styrene copolymer, a (meth)acrylic acid-(meth)acrylate ester copolymer, a styrene-maleic acid copolymer, a polyvinyl alcohol or a polyvinyl pyrrolidone; a polyester, a modified polyacrylate, an adduct of ethylene oxide/propylene oxide can also be used. These can be used singly or in combination.

The surfactant as the dispersing aid includes anionic surfactants such as sodium lauryl sulfate, polyoxyethylene alkyl ether sulfate, sodium dodecylbenzenesulfonate, an alkali salt of a styrene-acrylic acid copolymer, sodium stearate, sodium alkylnaphthalenesulfonate, sodium alkyldiphenyl ether disulfonate, monoethanolamine lauryl sulfate, triethanolamine lauryl sulfate, ammonium lauryl sulfate, monoethanolamine stearate, sodium stearate, sodium lauryl sulfate and monoethanolamine of a styrene-acrylic acid copolymer, and polyoxyethylene alkyl ether phosphate ester; nonionic surfactants such as polyoxyethylene oleyl ether, polyoxyethylene lauryl ether, polyoxyethylene nonylphenyl ether, poolyoxyethylene alkyl ether phosphate ester, polyoxyethylene sorbitan monostearate and polyethylene glycol monolaurate; cationic surfactants such as a quaternary alkylammonium salt and an ethylene oxide adduct thereof; and amphoteric surfactants such as alkyl betaines such as alkyldimethylaminoacetic acid betaine and alkylimidazolines. These can be used singly or in combination.

The blue colored composition of the present invention can contain a solvent in order to sufficiently disperse the blue colorant of the invention in the pigment carrier and facilitate coating of the composition on a transparent substrate such as glass to a thickness of 0.2 to 5 μm when dried to form filter segments. Examples of the solvent include cyclohexanone, ethylcellosolve acetate, butylcellosolve acetate, 1-methoxy-2-propyl acetate, diethylene glycol dimethyl ether, ethylbenzene, ethylene glycol diethyl ether, xylene, ethylcellosolve, methyl n-amyl ketone, propylene glycol monomethyl ether toluene, methyl ethyl ketone, ethyl acetate, methanol, ethanol, isopropanol, butanol, isobutyl ketone, and a petroleum solvent. These can be used singly or in combination. The solvent can be used in an amount of, preferable 800% to 4000%, more preferably 1000 to 2500%, based on the total weight of the blue and violet pigments.

Further, the blue colored composition of the present invention can contain a storage stabilizer for stabilizing the viscosity of the composition over time. Examples of the storage stabilizer include quaternary ammonium chlorides such as benzyltrimethyl chloride and diethylhydroxyamine, organic acids such as lactic acid and oxalic acid and methyl ether thereof, t-butylpyrocatechol, organic phosphines such as tetraethylphosphine and tetraphenylphosphine, and a salt of phosphorous acid. The storage stabilizer can be used by an amount of 0.1% to 10% based on the weight of the colorant.

The blue and violet pigments are contained in the blue colored composition containing the solvent in an amount of, preferably, 1.5 to 7% by weight in total. Further, the blue and violet pigments are contained in the final filter segment in an amount of, preferably 10 to 40% by weight,. more preferably 20 to 40% by weight, and the balance may be substantially composed of a resinous binder provided by the pigment carrier.

It is preferable that large grains of 5 μm or more, preferably 1 μm or more and more preferably 0.5 μm or more and mixed dusts are removed by means of, e.g., centrifugal separation, a sintered filter or a membrane filter from the composition of the present invention.

Next, the color filter of the present invention is explained.

The color filter of the present invention has at least one filter segment which is formed using the blue colored composition of the present invention. The color filter includes an additive mixture type which comprises at least one red filter segment, at least one green filter segment and at least one blue filter segment, and a subtractive mixture type which comprises at least one magenta filter segment, at least one cyan filter segment and at least one yellow filter segment.

A red filter segment can be formed using a conventional red colored composition. A red colored composition can have the same composition as that of the blue colored composition of the present invention except that a red pigment is used in place of the blue pigment and the violet pigment. As the red pigment, for example, C. I. Pigment Red 7, 14, 41, 48:1, 48:2, 48:3, 38:4, 81:1, 81:2, 81:3, 81:4, 146, 168, 177, 178, 184, 185, 187, 200, 202, 208, 210, 246, 254, 255, 264, 270, 272 and 279 can be used. In the red colored composition, an orange pigment such as C. I. Pigment Orange 43, 71 and 73 can be additionally used.

A green filter segment can be formed using a conventional green colored composition. The green colored composition can have the same composition as that of the blue colored composition of the present invention except that a green pigment is used in place of the blue pigment and the violet pigment. As the green pigment, for example, C. I. Pigment Green 7, 10, 36 and 37 can be used. In the green colored composition, a yellow pigment such as C. I. Pigment Yellow 1, 2, 3, 4, 5, 6, 10, 12, 13, 14, 15, 16, 17, 18, 24, 31, 32, 34, 35, 35:1, 36, 36:1, 37, 37:1, 40, 42, 43, 53, 55, 60, 61, 62, 63, 65, 73, 74, 77, 81, 83, 93, 94, 95, 97, 98, 100, 101, 104, 106, 108, 109, 110, 113, 114, 115, 116, 117, 118, 119, 120, 123, 126, 127, 128, 129, 138, 139, 147, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 198, 199, 213 and 214 can be additionally used.

A magenta filter segment can be formed using a conventional magenta colored composition. The magenta colored composition can have the same composition as that of the blue colored composition of the present invention except that a violet pigment and a red pigment are used in place of the blue pigment and the violet pigment. As the violet pigment and red pigment, for example, C. I. Pigment Violet 1 and 19, C. I. Pigment Red 144, 146, 177, 169 and 81 can be used.

A yellow filter segment can be formed using a conventional yellow colored composition. The yellow colored composition can have the same composition as that of the blue colored composition of the present invention except that the aforementioned yellow pigment is used in place of the blue pigment and the violet pigment.

The color filter of the present invention can be prepared by forming each color filter segment on a transparent substrate using the blue colored composition of the invention and the aforementioned colored composition of each color by a printing method or a photolithography method.

As the transparent substrate, a glass plate, and a resin plate such as polycarbonate, methyl polymethacrylate, and polyethylene terephthalate is used.

Since in formation of each color filter segment by the printing method, patterning can be performed only by repeating printing and drying a colored composition prepared as the various printing inks, this is low cost and excellent in mass production as a method of preparing a color filter. Further, with development of printing techniques, a fine pattern having a high dimensional precision and smoothness can be printed. In order to perform printing, such the composition is preferable that an ink is not dried and solidified on a printing plate or a blanket. Control of flowability of an ink on a printing machine is also important, and a viscosity of an ink can be adjusted by a dispersant and a loading pigment.

When each color filter segment is formed by the photolithography method, a colored composition prepared as the solvent developing-type or alkali developing-type coloring resist is coated at a dry thickness of 0.2 to 5 μm on a transparent substrate by a coating method such as spray coating, spin coating, slit coating, and roll coating. A film which has been dried if necessary is exposed to ultraviolet-ray through a mask having a predetermined pattern which is provided in a state where it is contacted or not contacted with this film. Thereafter, the film is soaked in an alkali developer or a developer is sprayed by spraying, an uncured part is removed to form a desired pattern, and the same procedure is repeated regarding other color. In this way, a color filter can be prepared. Further, in order to promote polymerization of the coloring resist, heating can be performed if necessary. By a photolithography method, a color filter can be prepared which has a higher precision than by the printing method.

Upon development, as the alkali developer, an aqueous solution of sodium carbonate or sodium hydroxide is used, and an organic alkali such as dimethylbenzylamine and triethanol amine can be also used. An anti-foaming agent and a surfactant may be added to the developer.

In order to increase an ultraviolet-ray exposure sensitivity, after the colored resist is coated and dried, a water-soluble or aqueous alkali solution-soluble resin such as polyvinyl alcohol and a water-soluble acrylic resin is coated and dried to form a film for preventing polymerization inhibition due to oxygen, and thereafter, ultraviolet-ray exposure may be performed.

The color filter of the present invention can be prepared by an electrodeposition method or a transferring method in place of the aforementioned methods, and the colored composition of the present invention can be used in any method. The electrodeposition method is a method of, by utilizing a transparent electrically conductive film formed on a transparent substrate, preparing a color filter by electrodeposition-forming each color filter pigment on the transparent electrically conductive film by electrophoresis of a colloid particle. In addition, the transferring method is a method of forming a color filter layer on a surface of a peelable transfer base sheet in advance, and transferring this color filter layer onto a desired transparent substrate.

The present invention will be explained in more detail below by way of Examples, but the following examples do not limit the scope of the present invention at all. In Examples, "part" indicates "part by weight".

Prior to describing Examples, methods for measuring an average primary particle diameter and a specific surface area of a pigment, viscosity properties of a resist, and a contrast ratio of a coated film will be explained.

An average primary particle diameter of a pigment was measured by a general method for directly measuring a size of a primary particle from an electron micrograph. Specifically, a short axis diameter and a long axis diameter of a primary particle of individual pigments were measured, and an average was adopted as a particle diameter of the pigment particles. Then, regarding 100 or more pigment particles, a volume (weight) of each particle was obtained by approximating as a rectangular parallelepiped having the obtained particle diameter, and a volume average particle diameter was adopted as an average primary particle diameter. By using any of transmission type (TEM) and scanning type (SEM) as an electron microscope, the same result is obtained.

A specific surface area of a pigment particle was obtained by a BET method by nitrogen adsorption. In measurement, an automatic steam absorption amount measuring apparatus ("BELSORP18" manufactured by Bel Japan, Inc.) was used.

As a viscosity of a resist, a viscosity at a rotation number of 20 rpm was measured using an E-type viscometer ("ELD-type viscometer" manufactured by Toki Sangyo Co., Ltd.). Further, a ratio of a viscosity at 6 rpm and that at 60 rpm (called thixotropy index; as a value is greater, thixotropic property is higher) was obtained, and thixotropic property was assessed.

Then, a method of measuring a contrast ratio of a coated film prepared using a resist will be explained by referring to FIGURE. Light emitted from a back light unit 7 for a liquid crystal display is polarized by passing through a polarizer 6, passes through a dry coated film 4 of a colored composition coated on a glass substrate 5, and reaches a polarizer 3. When a plane of polarization of the polarizer 6 and that of the polarizer 3 are parallel, light passes through the polarizer 3. On the other hand, when planes of polarization are orthogonal, light is interrupted by the polarizer 3. However, when light polarized by the polarizer 6 passes through the dry coated film 6 of the colored composition, scattering occurs due to pigment particles. If a shift occurs in a part of the plane of polarization, when the polarizers are parallel, an amount of light passing through the polarizer 3 is decreased and, when the polarizers are orthogonal, a part of light passes through the polarizer 3. A luminance on the polarizer of this transmitted light was measured with a luminance meter 1, and a ratio of a luminance when the polarizers 3 and 6 are parallel, (parallel luminance) and a luminance when they are orthogonal (orthogonal luminance) (contrast ratio) was calculated.

Contrast ratio=parallel luminance/orthogonal luminance

Therefore, when scattering occurs due to the pigment of the dry coated film 4 of the colored composition, since the parallel luminance is reduced, and the orthogonal luminance is increased, the contrast ratio is reduced.

As the luminance meter 1, a color luminance meter ("BM-5A" manufactured by Topcon) was used, and as the polarizer, a commercially available polarizer ("NPF-G1220DUN" manufactured by Nitto Denko co.) was used. Upon measurement, in order to interrupt unnecessary light, a black mask 2 having a hole of 1 cm square was applied to a part to be measured.

Blue pigments and violet pigments having an adjusted specific surface area were obtained by the following method. Table 1 shows an average primary particle diameter and a specific surface area of untreated pigments and the prepared pigments.

Preparation of Blue Pigment 1

500 Parts of a copper phthalocyanine blue pigment C. I. Pigment Blue 15:6 ("Lyonol Blue ES" manufactured by Toyo Ink Co., Ltd.), 2500 parts of sodium chloride, and 250 parts of polyethylene glycol (manufactured by Tokyo Kasei Kogyo Co., Ltd.) were charged into a one-gallon stainless steel kneader (manufactured by Inoue Manufacturing Co., Ltd.) and kneaded at 120° C. for 6 hours. Then, this mixture was placed into about 5 liter of warm water, and stirred with a high speed mixer for about 1 hour while heating at about 70° C. to obtain a slurry. The slurry was filtered, washed with water to remove sodium chloride and diethylene glycol, and dried at 80° C. for 24 hours to obtain 490 parts of a salt milling-treated pigment (blue pigment 1).

Preparation of Blue Pigment 2

A blue pigment 2 was obtained in the same manner as in the method of preparing the blue pigment 1 except that the kneading time with the kneader was changed to 12 hours.

Preparation of Blue Pigment 3

A blue pigment 3 was obtained in the same manner as in the method of preparing the blue pigment 1 except that 75 parts of 500 parts of the copper phthalocyanine blue pigment was changed to Derivative 48.

Preparation of Violet Pigment 1

500 Parts of a dioxazine violet pigment C. I. Pigment Violet 23 ("Fast Violet RL" manufactured by Clariant), 2500 parts of sodium chloride, and 250 parts of polyethylene glycol (manufactured by Tokyo Kasei Kogyo Co., Ltd.) were charged into a 1 gallon kneader (manufactured by Inoue Manufacturing Co., Ltd.) made of stainless, and kneaded at 120° C. for 6 hours. Then, this mixture was placed into about 5 liter of warm water, and stirred with a high speed mixer for about 1 hour while heating at about 70° C. to obtain a slurry. The slurry was filtered, washed with water to remove sodium chloride and diethylene glycol, and dried at 80° C. for 24 hours to obtain 490 parts of a salt milling-treated pigment (violet pigment 1).

Preparation of Violet Pigment 2

A violet pigment 2 was obtained in the same manner as in the method of preparing the violet pigment 1 except that the kneading time with the kneader was changed to 12 hours.

Preparation of Violet Pigment 3

A violet pigment 3 was obtained in the same manner as in the preparation of the violet pigment 1 except that the amount of sodium chloride was changed to 5000 parts.

Preparation of Violet Pigment 4

600 Parts of a dioxazine violet pigment C. I. Pigment Violet 23 ("Fast Violet RL" manufactured by Clariant) was placed into 6000 parts of 96% sulfuric acid, this was stirred for 1 hour, and poured into water at 5° C. After stirred for 1 hour, the mixture was filtered, washed with warm water until the washing solution became neutral, and dried at 70° C. The resulting acid pasting-treated pigment was salt milling-treated in the same manner as in the violet pigment 1, to obtain a violet pigment 4.

Preparation of Violet Pigment 5

A violet pigment 5 was obtained in the same manner as in the preparation of the violet pigment 4 except that 50 parts of 500 parts of the acid pasting-treated pigment used at salt milling treatment was changed to Derivative 49.

Preparation of Violet Pigment 6

A violet pigment 6 was obtained in the same manner as in the preparation of the violet pigment 5 except that salt milling treatment was changed to dry milling treatment for 2 hours using an attritor (using steel beads).

EXAMPLES 1 TO 9, COMPARATIVE 1 TO 3

Using the blue pigment and the violet pigment shown in Table 4, a pigment dispersion and a resist were obtained successively by the following method. First, an example of preparing a resin solution used for preparing a pigment dispersion and a resist will be explained below.

<EXAMPLE OF PREPARING RESIN SOLUTION>

800 Parts of cyclohexanone was placed into a reaction vessel, this was heated to 100° C. while a nitrogen gas was injecting into the vessel, a mixture of the following monomer and a thermal polymerization initiator was added dropwise at the same temperature over 1 hour to perform polymerization.

| | |
|---|---|
| Styrene | 60.0 parts |
| Methacrylic acid | 60.0 parts |
| Methyl methacrylate | 65.0 parts |
| Butyl methacrylate | 65.0 parts |
| Azobisbutyronitrile | 10.0 parts |

After addition, the materials were further reacted at 100° C. for 3 hours, a solution in which 2.0 parts of azobisisobutyronitrile had been dissolved in 50 parts of cyclohexanone was added, and the reaction was continued further for 1 hour to obtain a solution of an acrylic resin having a weight average molecular weight of about 40,000 (as measured by GPC).

After cooled to room temperature, a part of the resin solution was sampled, heated and dried at 180° C. for 20 minutes, and an unvolatile matter was measured. Based on the result of this measurement, cyclohexanone was added to the remaining resin solution so that the unvolatile matter became 20%, to prepare an acrylic resin solution.

Preparation of Pigment Dispersion

A mixture having the composition shown in Table 2 was uniformly stirred and mixed, dispersed for 5 hours with an Iger mill ("Minimodel M-250 MKII" manufactured by Iger Japan) using zirconia bead having a diameter of 1 mm, and filtered with a filter of 5 μm to prepare a pigment dispersion.

TABLE 1

| | Untreated blue pig. | Untreated purple pig. | Blue pig. 1 | Blue pig. 2 | Blue pig. 3 | Violet pig. 1 | Violet pig. 2 | Violet pig. 3 | Violet pig. 4 | Violet pig. 5 | Violet pig. 6 |
|---|---|---|---|---|---|---|---|---|---|---|---|
| Average primary particle diameter (μm) | 0.06 | 0.06 | 0.03 | 0.02 | 0.02 | 0.03 | 0.02 | 0.02 | 0.02 | 0.01 | 0.01 |
| Specific surface area (m$^2$/g) | 79.6 | 85.6 | 93.0 | 99.2 | 120.8 | 103.8 | 113.9 | 110.3 | 109.4 | 124.4 | 121.6 |

As a derivative, Derivative 48 was used in preparation of a blue pigment dispersion, and Derivative 49 was used in preparation of a violet pigment dispersion. As a resin-type dispersant, a phosphate pigment dispersant ("BYK111" manufactured by Bick Chemie) was used.

TABLE 2

|  |  | Examples 1-2 and 4-9, and Comparative Examples 1-3 | | Example 3 | |
|---|---|---|---|---|---|
|  |  | Composition of Blue Pigment Dispersion | Composition of Purple Pigment Dispersion | Composition of Blue Pigment Dispersion | Composition of Purple Pigment Dispersion |
| Components | Pigment | 10 parts | 11 parts | 10 parts | 11 parts |
|  | Derivative | 2 parts | 1 part | 0 part | 0 part |
|  | Resin type Dispersant | 0 part | 0 part | 4 parts | 3 parts |
|  | Resin Solution | 40 parts | 40 parts | 38 parts | 38 parts |
|  | Solvent | 48 parts | 48 parts | 48 parts | 48 parts |
| Total |  | 100 parts | 100 parts | 100 parts | 100 parts |

Preparation of Resist

A mixture having the composition shown in Table 3 was stirred and mixed to uniform, and filtered with a filter of 1 µm to obtain an alkali developing-type blue resist.

Trimethylolpropane triacrylate ("NK ester ATMPT" manufactured by Shin-Nakamura Chemical Co., Ltd.) was used as a monomer, "Irgacure 907" (manufactured by Ciba Specialty Chemicals) was used as a photopolymerization initiator, (EAB-F" manufactured by Hodogaya kagaku) was used as a sensitizer, and cyclohexanone was used as a solvent.

TABLE 3

| Composition of resist | |
|---|---|
| Component | Amount |
| Blue pigment dispersion | 45 parts |
| Violet pigment dispersion | 2 parts |
| Resin solution | 5 parts |
| Monomer | 5.6 parts |

TABLE 3-continued

| Composition of resist | |
|---|---|
| Component | Amount |
| Photopolymerization initiator | 2 parts |
| Sensitizer | 0.2 part |
| Solvent | 40.2 parts |
| Total | 100 parts |

Preparation of Coated Film

Using a spin coater, the resulting resist was used to prepare three coated substrates so that a dry thickness became about 1 µm, by changing a rotation number. After coating, the substrates were dried at 80° C. for 30 minutes in a hot air oven, a thickness and a contrast ratio were measured for each substrate, and a contrast ratio at a thickness of 2 µm was obtained by a primary correlation method from three items of data.

A viscosity, and thixotropy index of the resist obtained as described above, and a contrast ratio of the coated film are shown in Table 4.

TABLE 4

|  | Ex. 1 | Ex. 2 | Ex. 3 | Ex. 4 | Ex. 5 | Ex. 6 | Ex. 7 | Ex. 8 | Ex. 9 | Comp. Ex. 1 | Comp. Ex. 2 | Comp. Ex. 3 |
|---|---|---|---|---|---|---|---|---|---|---|---|---|
| Blue pig. used | Blue pi. 2 | Blue pig. 2 | Blue pig. 2 | Blue pig. 2 | Blue pi. 1 | Blue pig. 2 | Blue pig. 2 | Blue pig. 2 | Blue pi. 3 | Untreat. | Untreat. | Blue pig. 2 |
| Purple pig. used | Purple pig. 1 | Purple pig. 2 | Purple pig. 2 | Purple pig. 3 | Purple pig. 4 | Purple pig. 4 | Purple pig. 5 | Purple pig. 6 | Purple pig. 5 | Untreat. | Purple pig. 2 | Untreat. |
| Resist vis. (mPa · s/ 20 rpm, 25° C.) | 6.9 | 7.1 | 19.7 | 7.5 | 5.8 | 5.9 | 6.1 | 6.0 | 6.1 | 6.6 | 6.7 | 7.2 |
| Resist thixo. index | 1.06 | 1.09 | 1.38 | 1.09 | 1.00 | 1.01 | 1.01 | 1.02 | 1.01 | 1.02 | 1.13 | 1.18 |

TABLE 4-continued

|  | Ex. 1 | Ex. 2 | Ex. 3 | Ex. 4 | Ex. 5 | Ex. 6 | Ex. 7 | Ex. 8 | Ex. 9 | Comp. Ex. 1 | Comp. Ex. 2 | Comp. Ex. 3 |
|---|---|---|---|---|---|---|---|---|---|---|---|---|
| Contrast ratio of coating | 880 | 980 | 730 | 1010 | 890 | 1040 | 1210 | 1160 | 1580 | 530 | 670 | 580 |

As in Examples, when a blue pigment and a violet pigment having a specific surface area controlled at a constant value are used, a colored composition excellent in flowability is obtained through an appropriate dispersing step, and a coated film having a high contrast ratio can be obtained. In particular, regarding a violet pigment dispersion, it is necessary to perform treatment of controlling a specific surface area and dispersing formation by controlling a specific surface area of a violet pigment, and taking a degree of adjusted particle size into consideration. When this is proper, a pigment having a high constant specific surface area is obtained, and a dispersion affording a coated film having a high contrast ratio is obtained.

As described above, since the blue colored composition for a color filter of the present invention contains a blue pigment and a violet pigment having a specific surface area which is controlled in a particular range, the composition is stable although it contains two kinds of pigments. By using the colored composition of the invention, a color filter having a high luminance and a high contrast ratio can be formed.

What is claimed is:

1. A blue colored composition for a color filter, which comprises:
    a pigment carrier comprising a transparent resin, a precursor thereof or a mixture thereof;
    a blue pigment having a specific surface area of 90 to 140 m²/g; and
    a violet pigment having a specific surface area in a range of 100 to 150 m²/g, but having a greater specific surface area than that of the blue pigment used.

2. The composition according to claim 1, wherein the blue pigment comprises a copper phthalocyanine pigment, and the violet pigment comprises a dioxazine pigment.

3. The composition according to claim 2, wherein the copper phthalocyanine pigment is Color Index Pigment Blue 15:6, and the dioxazine pigment is Color Index Pigment Violet 23.

4. The composition according to claim 1, wherein the composition further contains at least one derivative selected from a pigment derivative, an anthraquinone derivative, an acridone derivative and a triazine derivative, each having at least one basic group selected from a basic group of the following formula (1), a basic group of the following formula (2), a basic group of the following formula (3) and a basic group of the following formula (4):

Formula (1):

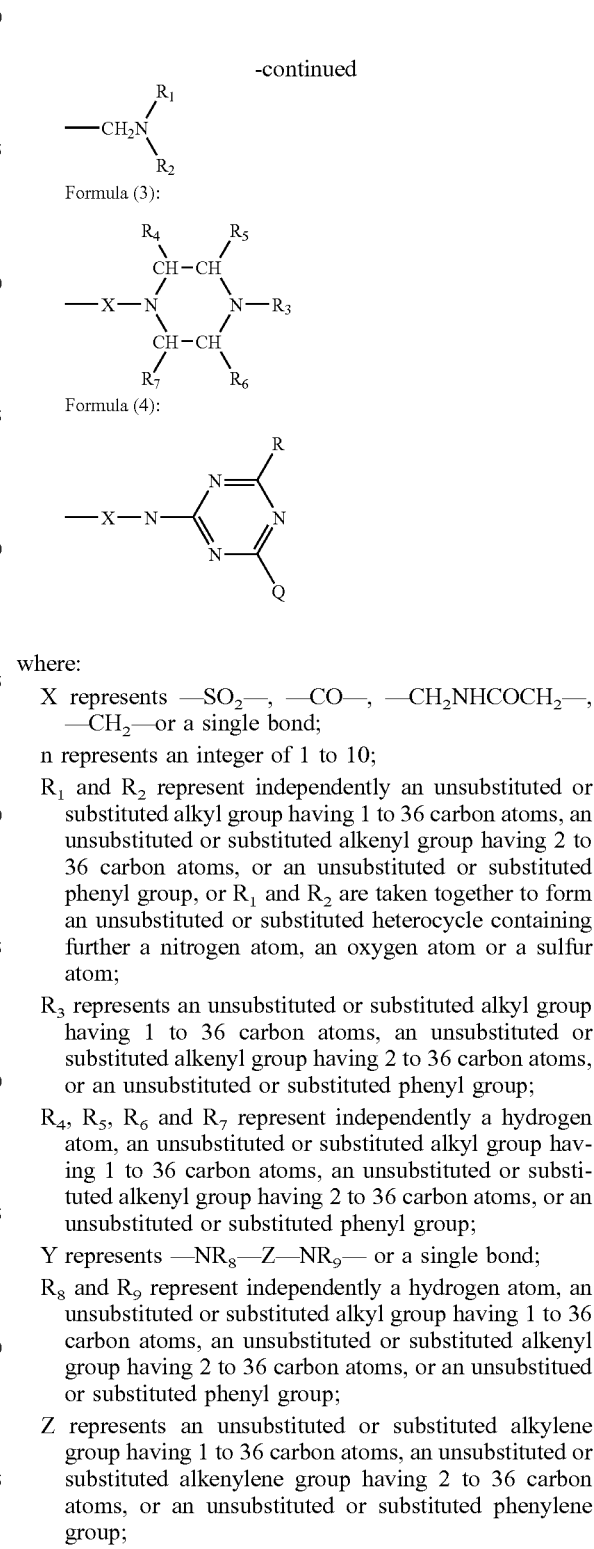

Formula (2):

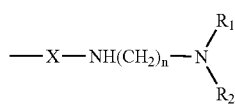

where:

X represents —SO$_2$—, —CO—, —CH$_2$NHCOCH$_2$—, —CH$_2$— or a single bond;

n represents an integer of 1 to 10;

R$_1$ and R$_2$ represent independently an unsubstituted or substituted alkyl group having 1 to 36 carbon atoms, an unsubstituted or substituted alkenyl group having 2 to 36 carbon atoms, or an unsubstituted or substituted phenyl group, or R$_1$ and R$_2$ are taken together to form an unsubstituted or substituted heterocycle containing further a nitrogen atom, an oxygen atom or a sulfur atom;

R$_3$ represents an unsubstituted or substituted alkyl group having 1 to 36 carbon atoms, an unsubstituted or substituted alkenyl group having 2 to 36 carbon atoms, or an unsubstituted or substituted phenyl group;

R$_4$, R$_5$, R$_6$ and R$_7$ represent independently a hydrogen atom, an unsubstituted or substituted alkyl group having 1 to 36 carbon atoms, an unsubstituted or substituted alkenyl group having 2 to 36 carbon atoms, or an unsubstituted or substituted phenyl group;

Y represents —NR$_8$—Z—NR$_9$— or a single bond;

R$_8$ and R$_9$ represent independently a hydrogen atom, an unsubstituted or substituted alkyl group having 1 to 36 carbon atoms, an unsubstituted or substituted alkenyl group having 2 to 36 carbon atoms, or an unsubstitued or substituted phenyl group;

Z represents an unsubstituted or substituted alkylene group having 1 to 36 carbon atoms, an unsubstituted or substituted alkenylene group having 2 to 36 carbon atoms, or an unsubstituted or substituted phenylene group;

R represents a substituent represented by the formula (5):

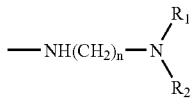

where n, $R_1$ and $R_2$ are as defined above, or a substituent represented by the formula (6):

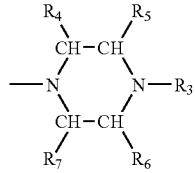

wherein, $R_3$ to $R_7$ are as defined above; and

Q represents a hydroxy group, an alkoxyl group, a substituent represented by the above formula (5) or a substituent represented by the above formula (6).

5. The composition according to claim 4, wherein a content of the basic group-containing derivative is 0.001 to 40% by weight, based on a total amount of the blue and violet pigments.

6. The composition according to claim 1, wherein each of the blue and violet pigments has an average primary particle diameter of 0.005 to 0.05 μm.

7. The composition according to claim 1, wherein a content of the violet pigment is 0.005 to 50% by weight, based on a total amount of the blue and violet pigments.

8. A color filter comprising a filter segment formed from the composition according to claim 1.

* * * * *